(12) United States Patent  
Philips et al.

(10) Patent No.: US 7,370,460 B1  
(45) Date of Patent: May 13, 2008

(54) DRAWN COTTON PICKER

(75) Inventors: Mark Samuel Philips, Grimes, IA (US); Jeffrey Robert Fox, Minburn, IA (US); Daniel John Johannsen, Ankeny, IA (US); Kent Cleo Mckee, Mingo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/583,452

(22) Filed: Oct. 19, 2006

(51) Int. Cl.  
*A01D 46/08* (2006.01)

(52) U.S. Cl. ......................................................... 56/28

(58) Field of Classification Search ................. 56/14.9, 56/15.1–15.3, 15.8, 15.9, 28–30  
See application file for complete search history.

(56) References Cited

U.S. PATENT DOCUMENTS

| | | | | |
|---|---|---|---|---|
| 1,802,022 A | * | 4/1931 | Johnston et al. ............. | 56/13.5 |
| 2,477,794 A | * | 8/1949 | Gehl .......................... | 56/13.9 |
| 2,650,461 A | * | 9/1953 | Kerr ........................... | 56/13.2 |
| 2,763,978 A | * | 9/1956 | Graham et al. ................ | 56/30 |
| 3,174,265 A | | 3/1965 | Capps | |
| 3,959,956 A | * | 6/1976 | Fowler ......................... | 56/30 |
| 4,255,919 A | | 3/1981 | Copley et al. | |
| 5,203,154 A | * | 4/1993 | Lesher et al. ................ | 56/366 |

* cited by examiner

*Primary Examiner*—Thomas B. Will  
*Assistant Examiner*—Alicia Torres

(57) ABSTRACT

One or two conventional picking units are mounted on a two-wheel, high clearance running gear or frame. A two-point hitch is coupled to the draft links of a tractor or an equal-angle hitch is coupled to the tractor drawbar. Hitch and tongue interface on the harvester facilitates sharp turn angles between the implement and the tractor through use of a pivoting member containing the driveline powering the units from the tractor. A center pivot tongue allows offset for appropriate row alignment and provides improved maneuverability and implement steering on headlands and turn rows. A hydraulic cylinder connected to the tongue or a crossed four-bar linkage structure controls tongue angle. A basket is supported at the rear of the frame and the row units are located forwardly of the frame to provide counterbalancing forces about the wheel axis.

20 Claims, 5 Drawing Sheets

DRAWN COTTON PICKER

FIELD OF THE INVENTION

The present invention relates generally to cotton harvesters and, more specifically, to a tractor-drawn cotton picker

BACKGROUND OF THE INVENTION

Much of the world cotton crop is harvested by hand, and cotton growers in many of the hand harvest regions are experiencing scarcity of laborers and rising labor costs. Often the cotton harvesting operations include a mix of hand labor and basic mechanization. Most cotton growers in the hand harvest regions cannot justify the capital required for self-propelled machines, and available small to medium sized tractors have insufficient capacity for a tractor-mounted harvester. Therefore, an efficient, low-cost cotton harvester powered by a small row-crop tractor is desirable to alleviate the burden of hand labor and shortage of labor in the many harvest regions.

SUMMARY OF THE INVENTION

In an embodiment of the invention, one or two conventional picking units are mounted on a special two-wheel, high clearance running gear. Tread spacing is adjustable for different row spacing. A two-point hitch is coupled to the draft links of a tractor or an equal-angle hitch is coupled to the tractor drawbar. Hitch and tongue interface on the harvester facilitates sharp turn angles between the implement and the tractor through use of a pivoting member containing the driveline powering the units from the tractor. An engine can be mounted on the implement to avoid the driveline.

A center pivot tongue allows offset for appropriate row alignment and provides improved maneuverability and implement steering on headlands and turn rows. A hydraulic cylinder connected to the tongue controls tongue angle, either automatically or manually. Alternatively, a crossed four-bar linkage structure can provide automatic steering that eliminates the need for an operator to manually steer the implement on the headlands or on the row.

Conventional picking units are mounted on a lift arm and frame structure. The frame structure provides adjustable unit location and adjustable spacing when more than one unit is carried on the running gear. The mounting also provides adjustable row unit pitch. A conventional hydraulic/mechanical height control system maintains each unit at the proper height above ground.

An air system conveys cotton from the picking units to a basket mounted behind the two running gear wheels. The contents of the basket can be conveniently unloaded into a trailer, accumulator or other cotton receiver for bagging or further processing. The basket is cantilevered rearwardly from the frame, and the forwardly mounted row units and tongue offset the weight of a full basket to provide a balanced full-basket condition.

These and other objects, feature and advantages of the present invention will become apparent from the description below in view of the drawings.

DESCRIPTION OF THE PREFERRED EMBODIMENT

Figure 1:
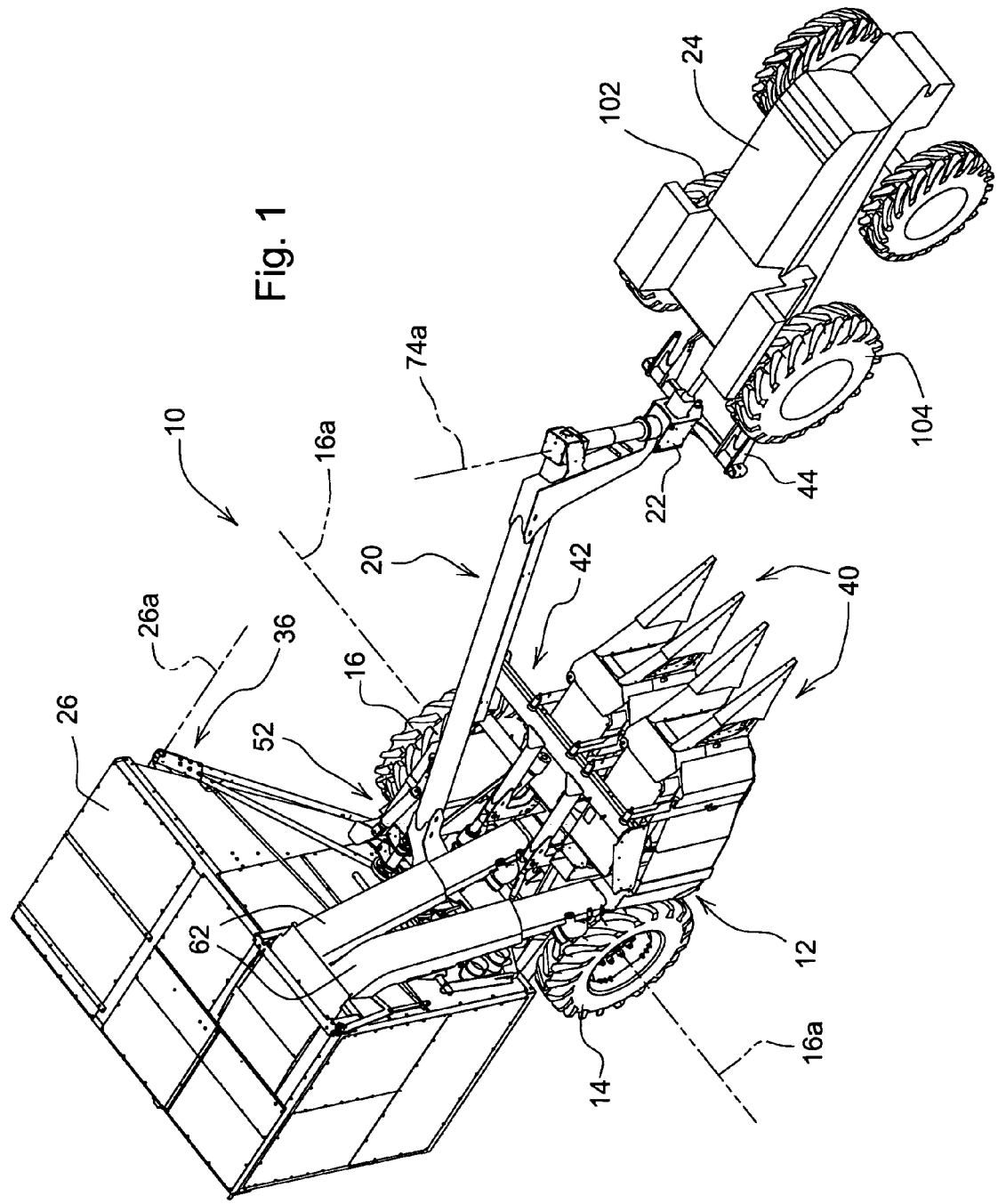
FIG. 1 is a perspective view of a towed cotton harvester and towing vehicle.
Figure 2:
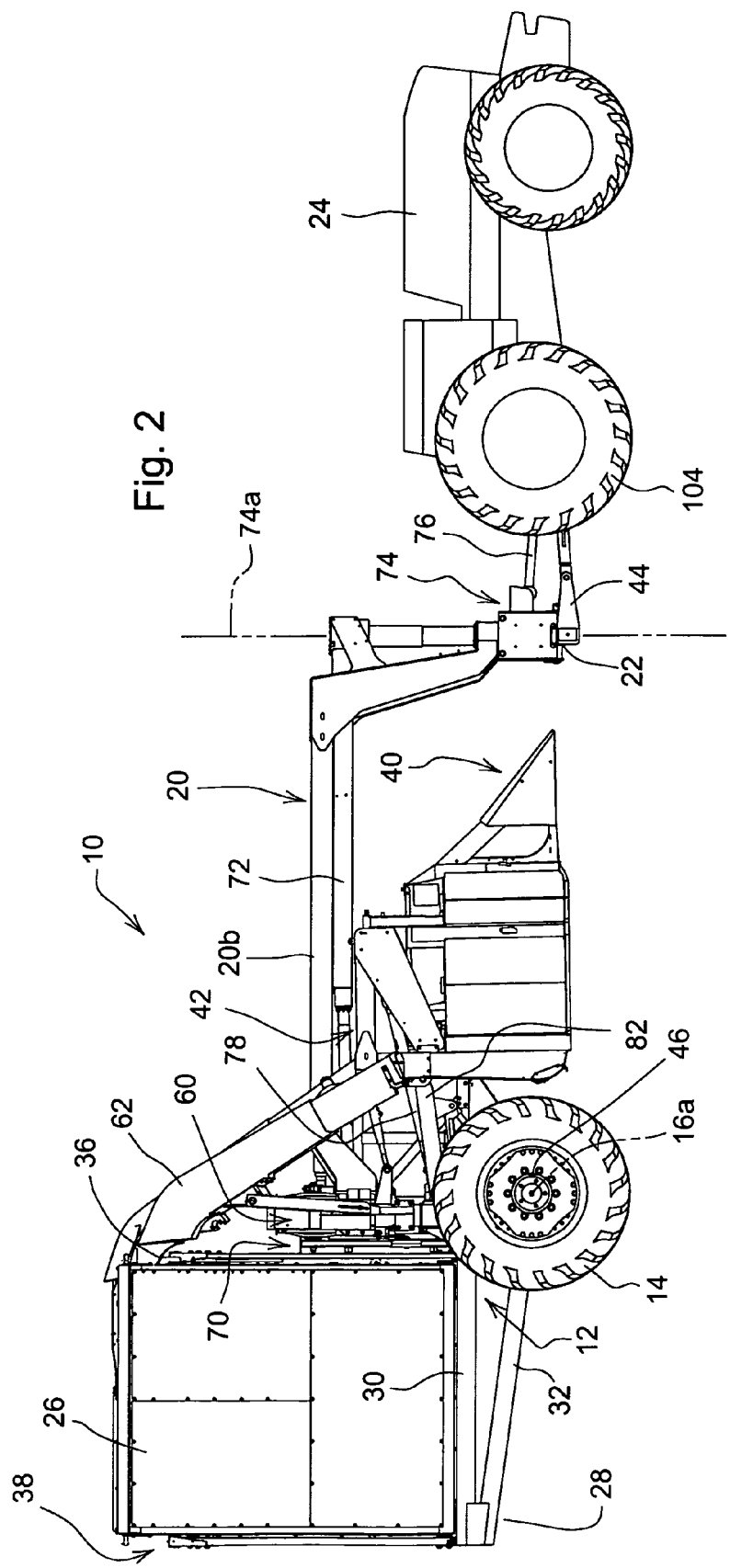
FIG. 2 is a side view of the harvester and vehicle of FIG. 1.
Figure 3:
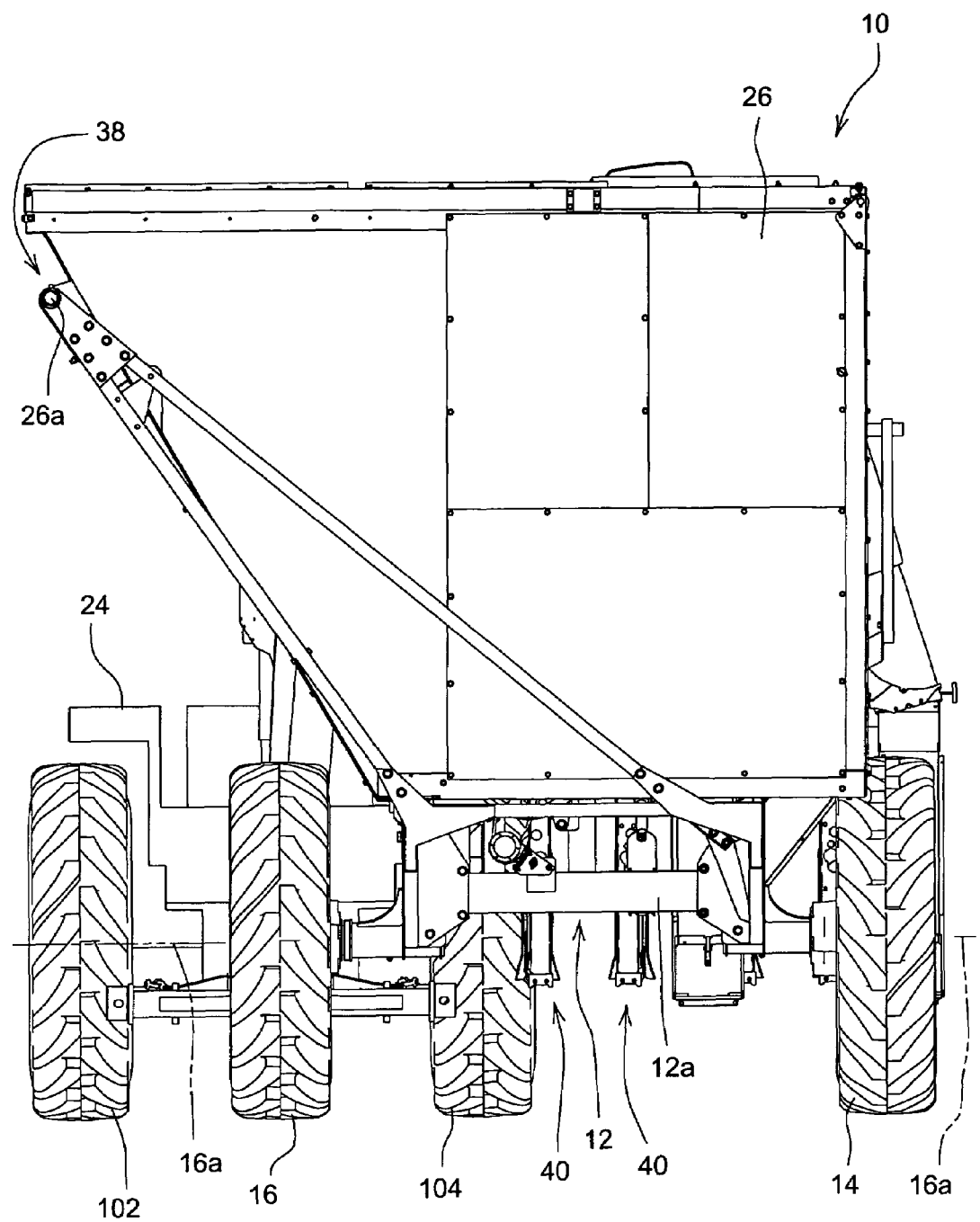
FIG. 3 is a rear view of the harvester and vehicle of FIG. 1.

Referring now to FIGS. 1-3, therein is shown a cotton harvester 10 having a main support frame or chassis 12. First and second transversely spaced wheels 14 and 16 are mounted on the frame 12 for rotation about an axis 16*a* located below a lowermost transverse main frame beam 12*a*. Tongue or hitch structure 20 is adjustably connected at an aft end to a central portion of the frame 12. The hitch structure 20 extends forwardly to a connecting end 22 adapted for attachment to a towing vehicle such as tractor 24 for forward movement over rows of cotton plants. The lowered offset axle axis 16*a*, as best seen in FIG. 3, provides good plant clearance under the main frame beam 12*a*.

A basket 26 is supported in cantilever fashion from the frame 12 by a rearwardly extending basket support frame 28 having upper horizontal tubes 30 and lower diagonal tubes 32 angling downwardly and forwardly from the aft end of the harvester 10. The forward end of each diagonal tube 32 is connected to the main support frame 12 adjacent the corresponding wheel 14 or 16.

As shown, mast assemblies 36 and 38 extend upwardly and outwardly from the main support frame 12 and the basket support frame 28 and pivotally connect the basket 26 for pivoting about a fore-and-aft extending basket axis 26*a* between a working position (shown) and a raised dumping position by hydraulic cylinders.

One or two cotton picker row units 40 are supported forwardly of the main frame 12 and forwardly of the wheels 14 and 16 generally below the hitch 20 by a unit support frame 42. The row unit or units 40 are transversely adjustable on the unit support frame 42 to accommodate different row spacings and different harvester alignment positions relative to the cotton rows. As shown, the row unit or units 40 are offset towards one side of the centerline of the machine, and the basket axis 26*a* is offset towards the opposite side of the centerline so that the row units provide a counterbalance for the basket 26 as the basket is pivoted outwardly about the axis 26*a* during unloading. Also, the row units 40 are located forwardly of the wheel axis 16*a* of the wheels 14 and 16, and the center of gravity of the basket 26 is located rearwardly of the wheel axis to provide opposing counterbalance forces or rotational moments about the axis to help balance the machine fore-and-aft. The wheels 14 and 16 support most of the weight of the harvester 10 and contents of the basket 26, and the elongated hitch 20 maintains the desired angular position of the harvester 10 relative to the rotational axis of the wheels 14 and 16. As shown, the tractor 24 includes a vertically adjustable two-point hitch 44 which can be raised and lowered to change the working and transport angles of the harvester 10 about the wheel axis 16*a*. In addition, the row unit attitude can also be adjusted by changing the angle of the unit support frame 42 as described in detail below.

Figure 4:
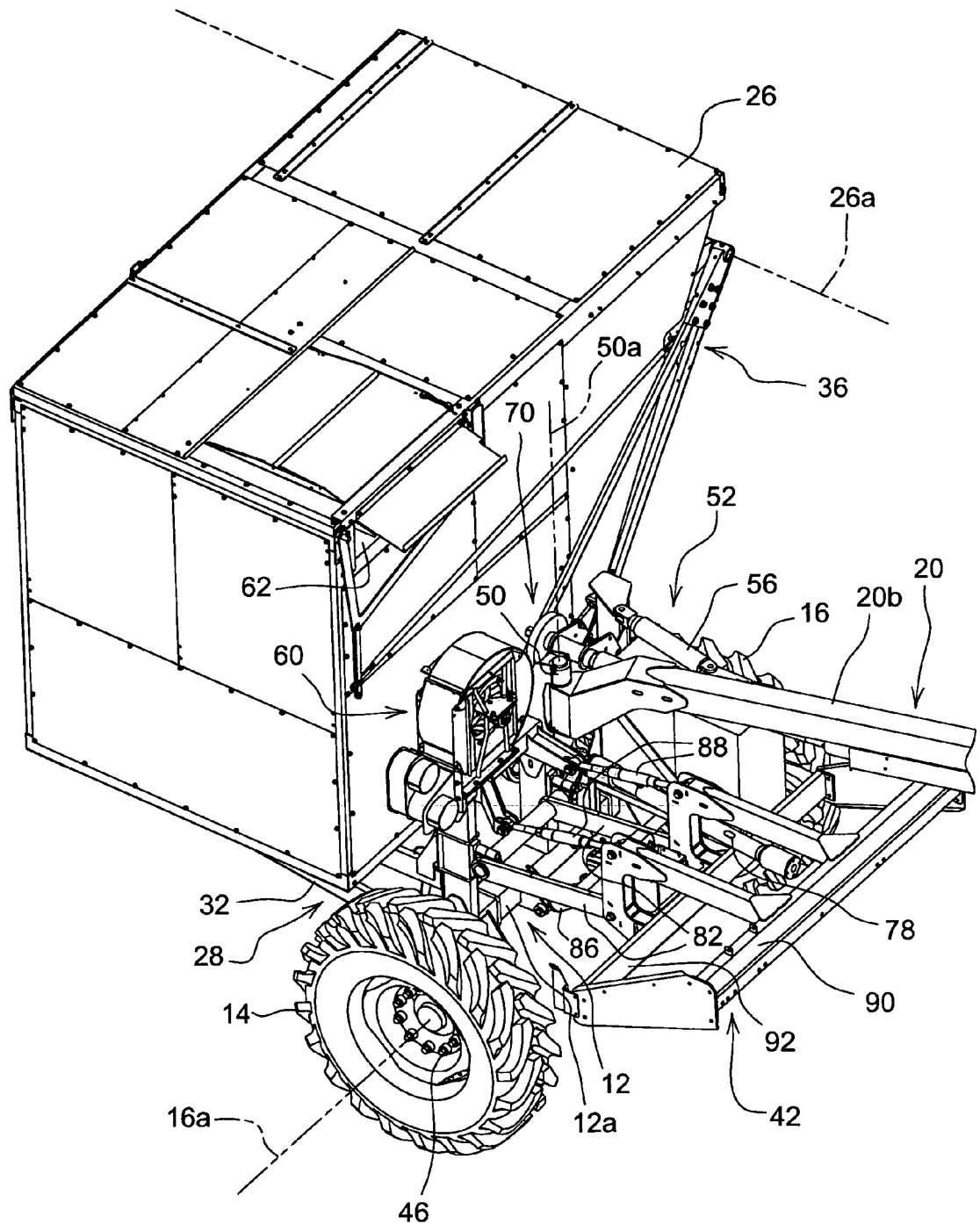
FIG. 4 is a perspective view of a portion of the harvester of FIG. 1 with parts removed to better show the support frame and basket.
Figure 5:
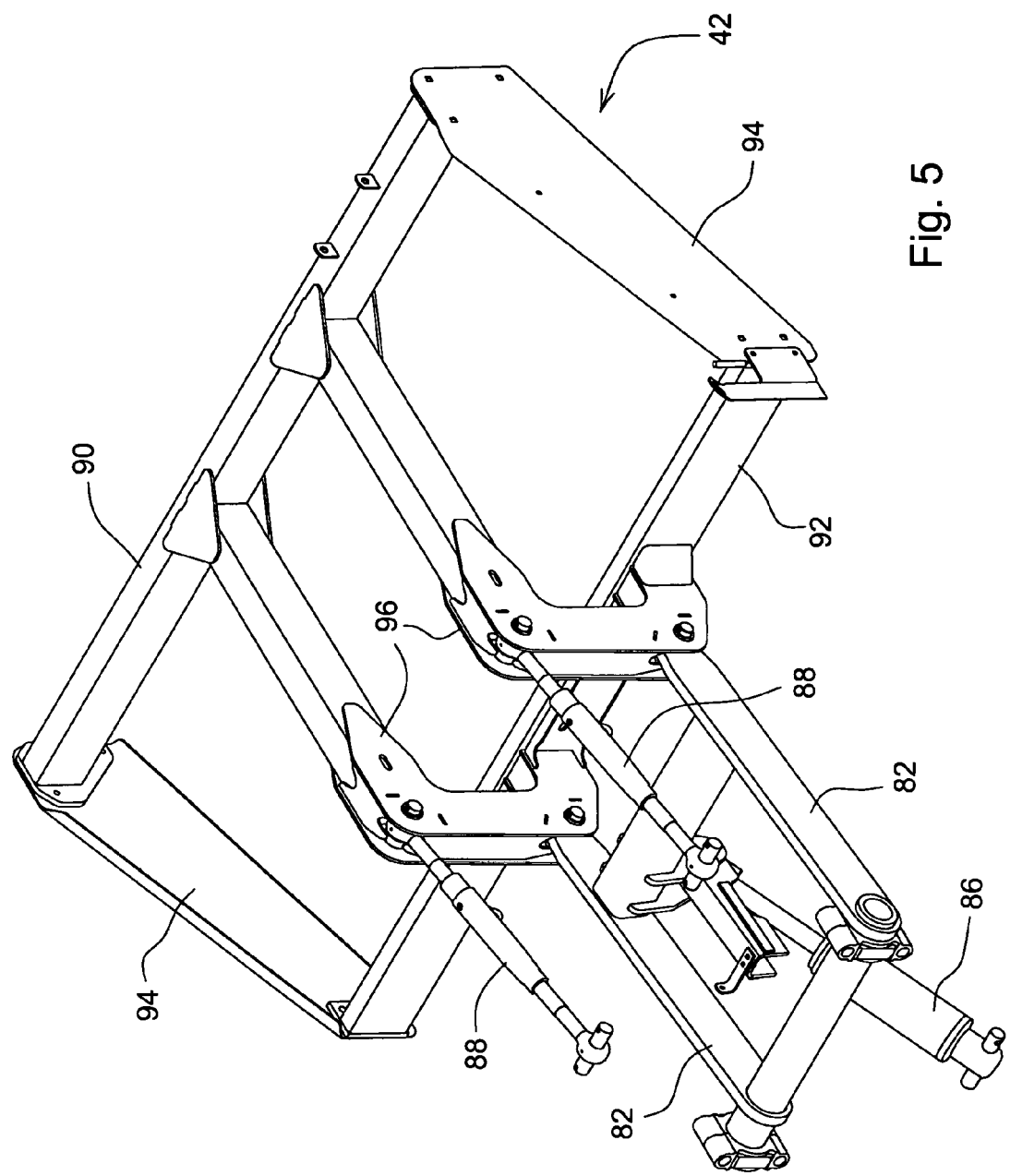
FIG. 5 is an enlarged perspective view of the row unit lift frame for the harvester of FIG. 1.

The wheels 14 and 16 include adjustment hubs 46 facilitating changing the spacing of the wheels and the location of the wheels relative to the frame 12. The aft end of the hitch structure 20 is pivotally connected to an upright pivot post 50 (FIG. 4) for rotation about an upright axis 50a. Hitch angle adjusting structure 52 positively controls the angle of the hitch structure 20 relative to the frame 12 to help steer the harvester 10 relative to the rows of cotton plants and to improve maneuverability and implement steering on headlands and turn rows. As shown, a hydraulic cylinder 56 connected between the hitch structure and the frame 12 controls tongue angle, either automatically or manually from a conventional hydraulic control on the tractor 24. Alternatively, a crossed four-bar linkage structure (not shown) or other mechanical steering arrangement can be utilized to provide automatic steering that eliminates the need for an operator to manually steer the implement on the headlands or on the row.

Fan structure indicated generally at 60 provides a source of air to air ducts 62. The ducts extend upwardly from the row unit or units 40 and convey cotton from the units to an upper forward cotton inlet 62 located rearwardly and above the right wheel 14.

Drive structure 70 is supported rearwardly of the hitch structure 20 and is connected to a drive shaft 72 that extends forwardly under a main fore-and-aft hitch beam 20b to an angle drive 74. The angle drive 74 operably connects drive shaft 72 to a tractor power take off 76 and facilitates pivoting of the forward end of the hitch structure 20 about an upright axis 74a of the angle drive. The drive structure 70 powers the fan structure 60 and a row unit driveshaft 78 connected to harvesting structure on the row units 40. Alternatively, an engine can be supported on the frame 12 to drive the row units 40 and the fan structure 60.

The row unit support frame 42 is connected to forward ends of lift arms 82. Aft ends of the lift arms 82 are pivotally connected to the frame 12, and cylinder structure 86 is connected between the lower portion of the frame 12 and the lift arms 82 to raise and lower the frame 42. Turnbuckles 88 are connected between the frame 12 and the support frame 42 to provide attitude control for the row units 40. The frame 42 includes forward and aft transverse rails 90 and 92 connected by end plates 94 and mast structure 96 which, in turn is connected to the forward ends of the lift arms 82 and the turnbuckles 88. The row units 40 depend from and are movable along the rails 90 and 92 to adjust row spacing and row unit placement relative to the frame 12 and wheels 14 and 16. The adjustability of the row units along the frame 42, the adjustability of the wheels 14 and 16 relative to the main support frame 12, and the positive angular adjustability of the hitch structure 20 provide the ability to accommodate a wide variety of row spacings and patterns. Tractor wheels (see for example 102 and 104 of FIG. 3) and harvester frame wheels 14 and 16 can be positioned as necessary to prevent crop and tire damage.

Having described the preferred embodiment, it will become apparent that various modifications can be made without departing from the scope of the invention as defined in the accompanying claims.

The invention claimed is:

1. A cotton harvester adapted for forward movement over rows of cotton plants by a towing vehicle, comprising:

a support frame including a main transverse beam having a horizontally extending central portion and upright outer portions extending downwardly from the central portion;

first and second transversely spaced wheels connected to lower ends of the outer portions for rotation about an axis located below the horizontally extending central portion, the wheels supporting the support frame above the ground;

an adjustable angle tongue having an aft end connected to the support frame and a forward end with a towing vehicle connector;

a basket carried by the support frame rearwardly of the wheels, the basket extending upwardly above the tongue rearwardly of the central portion and rockable about a pivot located outwardly of the tongue, and including basket support structure comprising upper horizontal tubes having a forward ends connected to the central portion and aft ends, lower transversely spaced diagonal tubes extending forwardly and downwardly from the aft ends to connection with the upright outer portions below the horizontal tube adjacent the wheels to define a plant receiving area between the diagonal tubes and below the main transverse beam; and at least one cotton harvesting row unit connected to the support frame forwardly of the wheels.

2. The cotton harvester as set forth in claim 1 wherein the basket is cantilevered rearwardly from the support frame, the row unit and the basket tending to bias the support frame in opposite directions about the wheels.

3. The cotton harvester as set forth in claim 1 wherein the frame, basket and the cotton harvesting row unit are supported above the ground substantially entirely on the first and second wheels and the tongue, and wherein the frame and the basket provide opposing moments about the wheels.

4. The cotton harvester as set forth in claim 1 wherein the tongue is pivotally connected to a central portion of the support frame for pivoting about an upright axis.

5. The cotton harvester as set forth in claim 4 including an angle adjusting member connected between the frame and the tongue for positively angling the tongue relative to the forward direction for steering of the harvester and for positioning of the row unit relative to the rows of cotton.

6. The cotton harvester as set forth in claim 4 wherein the tongue is supported above the row unit.

7. The cotton harvester as set forth in claim 3 wherein the towing connector comprises a vertically adjustable connector for adjusting fore-and-aft angular orientation of the harvester generally about an axis of the wheels.

8. The cotton harvester as set forth in claim 7 wherein the basket is cantilevered rearwardly from the frame.

9. The cotton harvester as set forth in claim 4 wherein the basket is pivotally connected to the frame for pivoting upwardly from a working position about the pivot outwardly on one side of the tongue and wherein the row unit is offset on a side of the tongue opposite the one side to counterbalance weight of the basket as the basket is pivoted upwardly.

10. The cotton harvester as set forth in claim 1 including tongue angle adjusting structure connected to the tongue for adjusting the angle of the tongue about an upright axis relative to the main frame.

11. The cotton harvester as set forth in claim 10 wherein the tongue angling structure includes a variable length member connected between the frame and the tongue.

12. The cotton harvester as set forth in claim 10 further comprising a vertically adjustable row unit frame connected to the support frame.

13. The cotton harvester as set forth in claim 12 wherein the row unit frame includes adjusting structure for tilting the row unit relative to the support frame, and wherein the towing vehicle connector is vertically adjustable for adjusting fore-and-aft angular orientation of the harvester generally about an axis of the wheels.

14. The cotton harvester as set forth in claim 1 including a drive extending between the forward end of the tongue and the cotton harvesting row unit for powering the row unit and a conveying fan located on the support frame and connected to the drive.

15. The cotton harvester as set forth in claim 14 wherein the drive comprises a right angle drive extending upwardly from the towing vehicle connector and rearwardly adjacent the tongue.

16. A cotton harvester adapted for forward movement over a field of cotton plants by a towing vehicle, comprising:
- a two wheel high clearance running gear having first and second transversely spaced wheels and a lowermost main transverse beam extending between the transversely spaced wheels and offset above axes of the wheels to provide plant clearance under the running gear;
- an adjustable angle hitch having an aft end connected to the running gear and a forward end with a vertically adjustable towing vehicle connector;
- a basket extending above and rearwardly of the main transverse beam and including a basket support structure carried by the support frame substantially entirely behind the wheels, the basket support structure comprising upper horizontal tubes having a forward ends connected to the main transverse beam and aft ends, lower transversely spaced diagonal tubes extending forwardly and downwardly from the aft ends to connections with the main transverse beam below the horizontal tubes adjacent the wheels to define a plant receiving area between the diagonal tubes and below the main transverse beam; and
- at least one cotton harvesting row unit connected to the support frame forwardly of the wheels.

17. The cotton harvester as set forth in claim 16 wherein the basket is cantilevered rearwardly from the chassis, the row unit and the basket tending to bias the support frame in opposite directions about the wheels, wherein the first and second wheels carry substantially all the weight of the basket and material in the basket.

18. The cotton harvester as set forth in claim 17 wherein the towing connector is movable vertically to adjust the angle of the harvester about an axis of the first and second wheels.

19. The cotton harvester as set forth in claim 16 wherein the hitch is pivotally connected to the running gear, and a hitch angle adjusting assembly connected to the hitch for adjusting the angle of the hitch relative to the chassis for steering the harvester relative to the cotton plants.

20. The cotton harvester as set forth in claim 16 wherein the wheels on the high clearance running gear comprise adjustable hub structure for changing wheel tread.

* * * * *